June 1, 1926.
W. A. DISCH
OILING DEVICE FOR VALVE GUIDE BUSHINGS
Filed Sept. 28, 1925
1,586,613
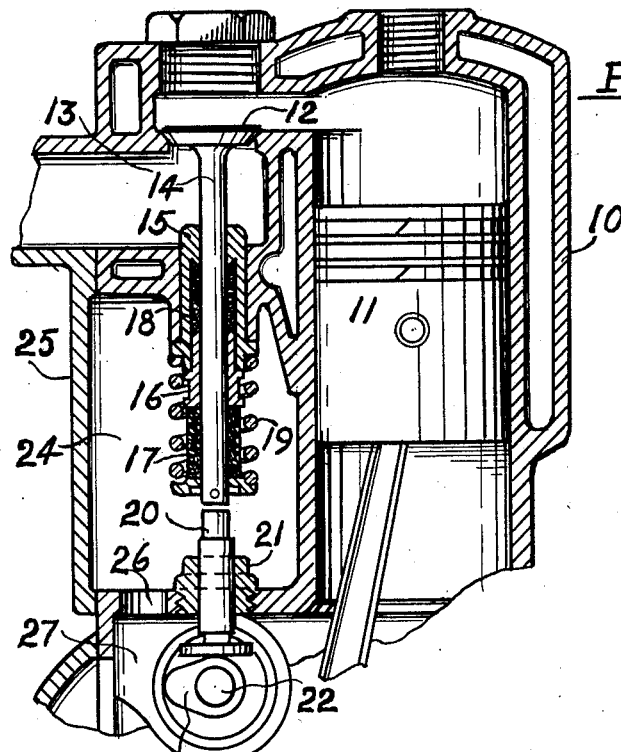
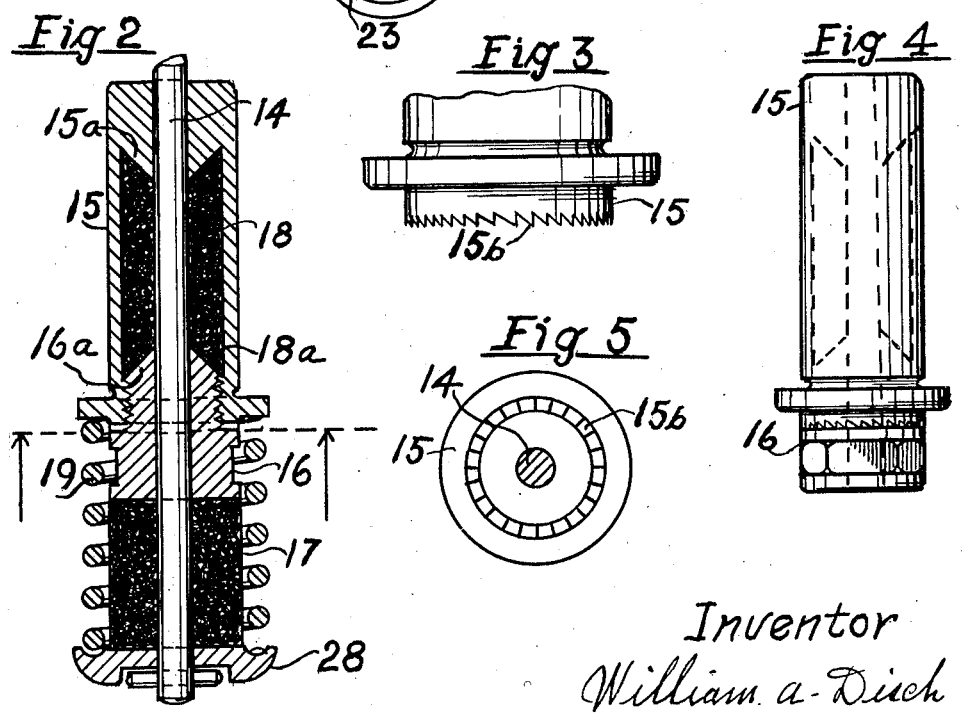
Inventor
William A. Disch Patented June 1, 1926.

1,586,613

UNITED STATES PATENT OFFICE.

WILLIAM A. DISCH, OF CHICAGO, ILLINOIS.

OILING DEVICE FOR VALVE-GUIDE BUSHINGS.

Application filed September 28, 1925. Serial No. 59,151.

My invention relates to an improved method of oiling or lubricating the stem portion of a valve for internal combustion engines, and this where the stem portion of the valve is supported by a valve guide bushing, or a bearing integral with the cylinder casting in the usual way, and also to oil the valve stem portion automatically with the splashing oil from the crank-case of an internal combustion engine.

I attain these objective results by a mechanism and with the method shown in the accompanying drawing in which, Fig. 1 is a vertical section of the common type of internal combustion engine with an enclosed piston 10, which is required and best suited to show the operation of my invention and its application to the valve of the engine.

Fig. 2 is a vertical section of the valve guide bushing and also shows the parts that operate together in order to oil and lubricate the valve stem which is hereinafter further described.

Fig. 3 is an enlarged view of a portion of the valve guide bushing in order to show the serrated teeth portion for locking the nut bearing to the valve guide bushing.

Fig. 4 is a view of the valve guide bushing with the attached nut bearing in place.

Fig. 5 is a lower view of the valve guide bushing with the valve stem 14, in section; this view is indicated by the arrows which point to the dotted lines in Fig. 2.

Similar numerals on the drawing refer to the same part shown throughout the different views.

The valve guide bushing 15 is fastened rigidly in place to an integral part of the cylinder portion 10 in the usual way as shown in Fig. 1. The nut bearing 16 is securely fastened in place in the chambered portion of the valve guide bushing 15 and in such a way that the two valve stem bearings are in line as shown in Fig. 2.

It will be noticed that the valve guide bushing 15 is provided with an annular chamber in which is supported a felt or fabric bushing 18. It will also be seen that the valve guide bushing 15 is provided with a conical extended portion 15ª which extends into the chamber as shown in Fig. 2.

It will also be seen by referring to Fig. 2 that the bearing nut 16 is also provided with a conical extended portion 16ª which is located in the chambered portion of the valve guide bushing 15 but in an opposite direction to 15ª and in such a way that the valve stem bearings are in line as shown in Fig. 2.

These conical members 15ª and 16ª are important elements in the operation of my oiling device as will be seen by a further description hereinafter.

It will be noticed by referring to Fig. 2 that below the nut bearing 16 and in contact with it, and also inside of the usual valve spring 19 and also again, outside of the valve stem 14 and surrounding it, is located a cylinder shaped fabric or felt 17.

I will hereafter refer to the fabric or felt 17 as the exposed fabric, and the fabric or felt inside of the valve guide bushing 18 as the enclosed fabric and this in order to more clearly describe my invention.

The exposed fabric or felt 17 is located inside of the valve spring 19 and is also seated on the spring washer 28. It is plain to see from this location as shown in Fig. 1 and Fig. 2 that the movement of the valve 12 up and down which is caused by the contact of the valve stem 14 to the valve plunger 20, supported by the usual bearing member 21, and this again in contact with the cam 23 with the action of the engine, will move the exposed fabric 17 up and down with the action of the spring 19 and the spring washer 28.

It is plain that the movement of the spring washer 28 on which the exposed fabric 17 is seated, will apply to the movement of the exposed fabric 17 and inasmuch as the exposed fabric 17 is in contact with the nut bearing 16 which is stationary, the action of the valve 12 controlled in the usual way by the cam 23, driven by the cam-shaft 22, will compress and release the exposed fabric 17 with each movement of the valve 12, and this while the location of the exposed fabric 17 is in such a position as shown in Fig. 1 that it will receive and absorb a charge of oil with each movement of the valve 12. This compressing and releasing of the exposed fabric 17 as stated, will pump or force a charge of oil into and through the bearing portion of the nut bearing 16, and this charge of oil passing up and through the bearing of the nut bearing 16 will be quickly absorbed by the enclosed fabric 18, and from there the oil received will be exposed to the valve stem 14, and in this way a constant lubrication of the valve stem 14 is provided.

While the amount of oil forced or pumped through the bearing of the nut bearing 16 may be small at each action of the valve 12 yet it is plain that the constant and rapid action of the valve 12 while the engine is running, will pump or force a quantity of oil to the enclosed fabric 18 where it is there absorbed to saturation for the constant oiling of the valve stem 14.

The exposed fabric 17 would preferably be made of a fabric material that would be much of an elastic nature, while the enclosed fabric 18 would be preferably made of a fabric of a light absorbent material that would be held lightly in suspension.

As stated the nut bearing 16 is provided with an extended cone portion 16ª while the valve guide bushing 15 is also provided with an extended cone portion 15ª. It will be noted by referring to Fig. 2 that the cone portions 15ª and 16ª are located in an opposed position to each other in the chamber portion of the valve guide bushing 16 and in such a way that they support the enclosed fabric 18 away from and in light contact with the valve stem 14.

If instead of a projecting cone portion 15ª and 16ª there were an inverted angle opposite to that shown in the drawing, then the nut bearing 16 would compress the enclosed fabric 18 in contact with the valve stem 14 the same as the usual packing nut, which is not wanted in this construction. The object is to hold the enclosed fabric 18 in light contact with the valve stem 14 and in such a way that the valve stem 14 may be removed without the enclosed fabric 18 closing in the hole left by removing the valve stem 14. If the enclosed fabric 18 were merely a packing, the fabric would close in when the valve stem 14 was removed and there would be a tight contact on the valve stem 14 which is not wanted. The enclosed fabric 18 must be light and absorbent instead of in a compressed condition.

It is plain from this that the shape of the extended cone portions 15ª and 16ª is important for the efficient oiling of the valve stem 14 as described.

Another advantage of the extended cone portions 15ª and 16ª as shown in the valve guide bushing 15 and the nut bearing 16, is the angular annular chamber pocket 18ª as shown in Fig. 2, this angular pocket 18ª is a receiver for the surplus oil that may not be absorbed by the enclosed fabric 18 and thereby holding a surplus charge of oil for use when necessary.

It will be seen by referring to Fig. 4 and Fig. 5 and also Fig. 3 with an enlarged view, that the valve guide bushing 15 is provided with serrated teeth 15ᵇ on the lower end, which engage with the nut bearing 16 when it is screwed in place as shown in Fig. 4, these serrated teeth 15ᵇ act as a lock by holding the nut bearing 16 securely in place when fastened in position, and also prevents the nut bearing 16 from unturning.

The valve housing 24 in Fig. 1 is connected with the inside of the crank-case 27 by means of holes 26 which are drilled in series in order to allow oil from the splash in the crank-case 27 to reach the valve housing 24 in the usual way, and in this manner supply the exposed fabric 17 with a constant supply of oil.

If the valve housing 24 were not covered with the member 25 as shown, then the oil may be supplied to the exposed fabric 17 by means of an ordinary oil-can with beneficial results.

It is plain that the exposed fabric 17 may be used for oiling the valve stem 14 without the enclosed fabric 18 with very good results if necessary, and also the exposed fabric 17 may be used with a plain valve guide bushing where there is a plain bearing without the chambered portion, and again the exposed fabric 17 may be used with good results where the valve stem bearing is located in the casting of an integral part of the cylinder and without the bushing.

Having described my invention, what I claim and desire to secure by Letters Patent is:

1. In an oiling device for valve guide bushings, a valve guide bushing provided with a bearing at one end and a chambered portion at the other end, a nut bearing member fastened to the chambered portion of the valve guide bushing, an enclosed fabric member in the chambered portion of the valve guide bushing, in combination with an exposed fabric member below the valve stem bearings in the valve guide bushing and in operating contact with the valve guide bushing.

2. In an oiling device for valve guide bushings, a valve guide bushing with a valve stem bearing at one end and a chambered portion at the other end, a nut bearing member fastened to the chambered portion of the valve guide bushing, an enclosed fabric in the chambered portion of the valve guide bushing, a valve stem adapted to slide in the valve stem bearing and operated by a coil spring, in combination with an exposed fabric member surrounded with the operating coil spring, operating contact between the exposed fabric member and the valve guide bushing and operating contact between the spring and the valve guide bushing.

WILLIAM A. DISCH.